(12) United States Patent
Sakata (10) Patent No.: US 9,381,910 B2
(45) Date of Patent: Jul. 5, 2016

(54) HYBRID ELECTRIC VEHICLE CONTROL DEVICE

(71) Applicant: Daimler AG, Stuttgart (DE)

(72) Inventor: Kunio Sakata, Kawasaki (JP)

(73) Assignee: Daimler AG, Stuttgart (DE)

(*) Notice: Subject to any disclaimer, the term of this patent is extended or adjusted under 35 U.S.C. 154(b) by 91 days.

(21) Appl. No.: 14/389,899

(22) PCT Filed: Mar. 28, 2013

(86) PCT No.: PCT/JP2013/059337
§ 371 (c)(1),
(2) Date: Oct. 1, 2014

(87) PCT Pub. No.: WO2013/150964
PCT Pub. Date: Oct. 10, 2013

(65) Prior Publication Data
US 2015/0072830 A1    Mar. 12, 2015

(30) Foreign Application Priority Data

Apr. 2, 2012    (JP) ................... 2012-084050

(51) Int. Cl.
*B60W 10/02*    (2006.01)
*B60W 20/00*    (2016.01)
(Continued)

(52) U.S. Cl.
CPC .............. *B60W 20/40* (2013.01); *B60K 6/48* (2013.01); *B60L 7/14* (2013.01); *B60L 11/14* (2013.01); *B60L 11/1861* (2013.01); *B60L 15/2009* (2013.01); *B60L 15/2054* (2013.01); *B60W 10/02* (2013.01); *B60W 10/06* (2013.01); *B60W 10/08* (2013.01); *B60W 10/113* (2013.01); *B60W 20/00* (2013.01); *B60W 30/18027* (2013.01); *B60K 2006/4825* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2240/80* (2013.01);
(Continued)

(58) Field of Classification Search
None
See application file for complete search history.

(56) References Cited

U.S. PATENT DOCUMENTS 7,001,299 B2    2/2006   Takagi et al.
8,066,620 B2 *  11/2011  Sah .................. B60K 6/365
                                                        477/175

(Continued)

FOREIGN PATENT DOCUMENTS

JP    2002-89594 A    3/2002
JP    2004-286183 A   10/2004
(Continued)

OTHER PUBLICATIONS

International Search Report (PCT/ISA/210) dated May 7, 2013 with English translation (four pages).
(Continued)

*Primary Examiner* — Sherry Estremsky
(74) *Attorney, Agent, or Firm* — Crowell & Moring LLP (57) ABSTRACT

When a vehicle is to be started solely by a motor immediately after an engine is started or the shift position has been changed from N range to D range, a delay time for delaying pre-charge of first and second clutches is set in accordance with operating oil temperature. The pre-charge is executed after a lapse of the delay time.

15 Claims, 3 Drawing Sheets

(51) Int. Cl.
*B60K 6/48* (2007.10)
*B60L 11/14* (2006.01)
*B60W 10/08* (2006.01)
*B60W 10/113* (2012.01)
*B60W 30/18* (2012.01)
*B60L 7/14* (2006.01)
*B60L 11/18* (2006.01)
*B60L 15/20* (2006.01)
*B60W 10/06* (2006.01)

(52) U.S. Cl.
CPC ....... *B60L 2270/145* (2013.01); *Y02T 10/6221* (2013.01); *Y02T 10/6252* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y10S 903/914* (2013.01); *Y10S 903/93* (2013.01); *Y10T 477/26* (2015.01)

(56) References Cited

U.S. PATENT DOCUMENTS 9,014,932 B2 * 4/2015 Nemoto .................. F16H 61/68
        701/58
2002/0033059 A1 3/2002 Pels et al.

FOREIGN PATENT DOCUMENTS

JP  2010-36781 A  2/2010
JP  2013-52807 A  3/2013

OTHER PUBLICATIONS

Japanese-language Written Opinion (PCT/ISA/237) dated May 7, 2013 (four pages).

* cited by examiner

HYBRID ELECTRIC VEHICLE CONTROL DEVICE

FIELD OF THE INVENTION

Exemplary embodiments of the present invention relate to hydraulic pressure control techniques applied to a hybrid electric vehicle provided with an engine and an electric motor both as a drive source for traveling and also provided as a transmission with a dual-clutch transmission having two transmission mechanisms, in order to suppress vibration caused by the electric motor at the start of the vehicle.

BACKGROUND OF THE INVENTION

A dual-clutch transmission for use as an automotive transmission has been developed that includes two clutches and two transmission mechanisms associated therewith and in which the selected gear is alternately switched between the two transmission mechanisms for changing speed. There is also known a hybrid electric vehicle which is equipped with such a dual-clutch transmission and also with an electric motor inserted in one of two power transmission systems and in which the drive source for moving the vehicle can be switched between the engine and the electric motor. See, for example, Japanese Laid-Open Patent Publication (KOKAI) No. 2010-36781.

When a vehicle equipped with such a dual-clutch transmission is traveling, the clutch associated with one of the transmission mechanisms currently used for the power transmission is engaged and the other clutch associated with the transmission mechanism in a standby state is disengaged. In transmissions using wet clutches, inclusive of the dual-clutch transmission, what is called pre-charge control (preliminary pressure application control) is executed whereby the clutch is charged with operating oil in advance of gear change so that the gear may be switched early. See, for example, Japanese Laid-Open Patent Publication (KOKAI) No. 2004-286183.

SUMMARY OF THE INVENTION

A hybrid electric vehicle is configured to be able to start from a standstill by using only the electric motor. Applying the pre-charge control disclosed in Japanese Laid-Open Patent Publication (KOKAI) No. 2004-286183 to the hybrid electric vehicle provided with a dual-clutch transmission disclosed in Japanese Laid-Open Patent Publication (KOKAI) No. 2010-36781 causes problems when the vehicle is started using the electric motor only. Specifically, vibration is caused when the clutch associated with the transmission mechanism to be used next is pre-charged by starting the engine.

This phenomenon is particularly noticeable when the temperature of the operating oil supplied to the clutch is high. Thus, the vibration is thought to occur because the clutch temporarily comes into a power transmission state due to excessive or pulsative supply of hydraulic pressure to the clutch, with the result that the idling of the engine interferes with the rotation of the electric motor which has begun rotating to start the vehicle.

Particularly in the case of a hybrid electric vehicle equipped with what is called an idling stop-auto start (automatic stop-and-restart) system whereby the engine is automatically stopped when the vehicle is parked or stopped at stoplights, and is automatically restarted when the vehicle is to be started, in order to improve fuel efficiency and exhaust emission characteristics, the vibration occurs with high frequency because the engine is frequently stopped and restarted, possibly making the driver feel uncomfortable.

Exemplary embodiments of the present invention solve this, and an object thereof is to provide a control device for a hybrid electric vehicle equipped with a dual-clutch transmission, whereby vibration caused by pre-charge control (preliminary pressure application control) at the start of the vehicle is suppressed to alleviate the driver's discomfort.

To attain the above object, exemplary embodiments of the present invention involve a control device for a hybrid electric vehicle which is provided with an engine and an electric motor both as a drive source for traveling, a transmission having a first transmission mechanism and a second transmission mechanism, a first power transmission system configured to transmit power of the engine to driving wheels through the first transmission mechanism, a second power transmission system configured to transmit the power of the engine and of the electric motor to the driving wheels through the second transmission mechanism, a first clutch associated with the first power transmission system and arranged between the engine and the transmission, and a second clutch associated with the second power transmission system and arranged between the engine and the electric motor, wherein the control device comprises: a hydraulic pressure supply unit configured to supply operating oil to the first and second clutches such that hydraulic pressure of the operating oil is applied to the first and second clutches; a preliminary pressure application control unit configured to execute preliminary pressure application control such that the first and second clutches are charged in advance with the operating oil by the hydraulic pressure supply unit before the first and second clutches are engaged; and a preliminary pressure application delay control unit configured to delay timing for starting the preliminary pressure application control by the preliminary pressure application control unit, by a predetermined delay time when the vehicle is to be started solely by the electric motor.

In the control device the preliminary pressure application delay control unit sets the delay time in accordance with temperature of the operating oil supplied by the hydraulic pressure supply unit.

When the vehicle is to be started solely by the electric motor after the engine in a stopped state is started, the preliminary pressure application delay control unit sets the delay time in accordance with a time over which the engine has been stopped.

The control device can also include an automatic engine stop-and-restart control unit configured to stop fuel supply to the engine when a predetermined automatic engine stop condition is fulfilled, and to restart the engine when a predetermined automatic engine start condition is fulfilled, wherein the preliminary pressure application delay control unit delays timing for starting the preliminary pressure application control by the preliminary pressure application control unit, by a predetermined delay time when the vehicle is to be started solely by the electric motor after the engine is restarted by the automatic engine stop-and-restart control unit.

The control device can also include a gear range detection unit configured to detect a gear range selected in the transmission, wherein the preliminary pressure application delay control unit delays timing for starting the preliminary pressure application control by the preliminary pressure application control unit, by a predetermined delay time when the vehicle is to be started solely by the electric motor after a changeover from a neutral range to a range for traveling is detected by the gear range detection unit.

When the control device is applied to a hybrid electric vehicle equipped with a dual-clutch transmission and when the vehicle is to be started solely by the electric motor, the timing for starting the preliminary pressure application control (pre-charge control), in which the first and second clutches are previously charged with the operating oil, is delayed by the predetermined delay time.

Since the start of the preliminary pressure application control is delayed when the vehicle is to be started solely by the electric motor, the preliminary pressure application control is executed after the rotation of the electric motor becomes stable. Accordingly, even if the clutch temporarily comes into a power transmission state due to the preliminary pressure application control, vibration attributable to the interference with the rotation of the engine does not occur.

It is therefore possible to suppress the vibration caused by the preliminary pressure application control at the start of the vehicle, whereby the driver's discomfort can be alleviated.

The delay time for which the start of the preliminary pressure application control is delayed is set in accordance with the temperature of the operating oil supplied to the clutches.

The vibration caused when the vehicle is started solely by the electric motor is thought to occur depending upon the temperature of the operating oil. Thus, by setting the delay time for delaying the preliminary pressure application control in accordance with the temperature of the operating oil, it is possible to appropriately suppress the vibration.

The hydraulic pressure supply unit is driven by rotation of the engine, and when the vehicle is to be started solely by the electric motor after the engine in a stopped state is started, the delay time for delaying the start of the preliminary pressure application control is set in accordance with the stop time over which the engine has been stopped.

Where the hydraulic pressure supply unit is configured to be driven by the rotation of the engine, the longer the engine stop time, the more operating oil escapes from the clutches. Thus, by setting the delay time for delaying the start of the preliminary pressure application control in accordance with the engine stop time, it is possible to appropriately suppress the vibration.

The control device can be employed with a vehicle configured to execute what is called automatic engine stop-and-restart control (idling stop-auto start control), and the preliminary pressure application delay control is executed when the vehicle is to be started solely by the electric motor after the engine is restarted by the automatic engine stop-and-restart control.

Thus, by causing the preliminary pressure application delay control to work with the automatic stop-and-restart control by which the engine is frequently stopped and restarted, it is possible to satisfactorily alleviate the driver's discomfort.

The preliminary pressure application delay control is executed when the vehicle is to be started solely by the electric motor after the gear range of the transmission is changed from the neutral range to a range for traveling.

While the transmission is in the neutral range, the operating oil escapes from the clutches. Accordingly, if the gear range has been changed from the neutral range to a range for moving the vehicle, the preliminary pressure application delay control is executed, whereby the vibration caused by the preliminary pressure application control at the start of the vehicle can be suppressed.

DETAILED DESCRIPTION

An embodiment of the present invention will be described below with reference to the accompanying drawings.

Figure 1:
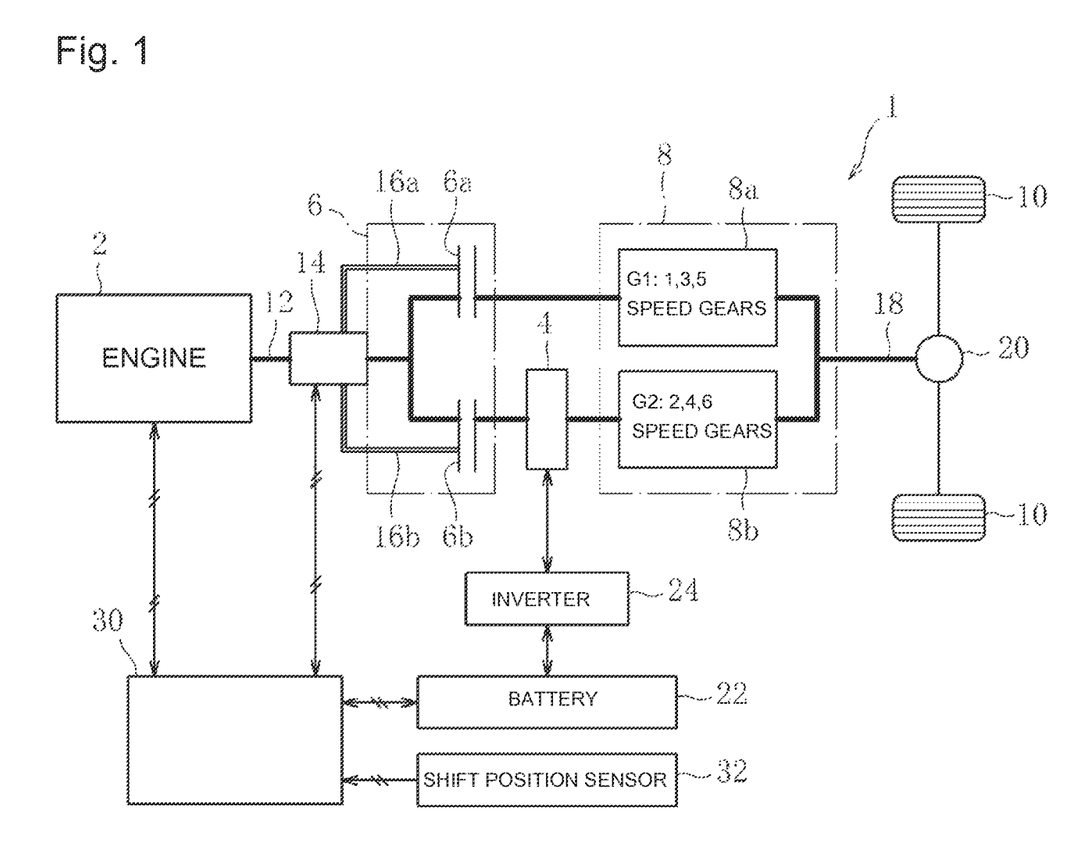
FIG. 1 schematically illustrates a configuration of a control device for a hybrid electric vehicle according to one embodiment of the present invention.

FIG. 1 is a block diagram illustrating a schematic configuration of a control device for a hybrid electric vehicle according to one embodiment of the present invention. Referring to the figure, the embodiment will be explained.

A vehicle 1 illustrated in FIG. 1 is a hybrid electric vehicle equipped with a drive assembly which is configured in such a manner that an engine 2 and a motor 4 (electric motor), both as a drive source for traveling, are connected to a transmission unit 8 (transmission) through a clutch unit 6. The vehicle 1 moves as the driving force from the engine 2 or the motor 4 or both is transmitted to right and left driving wheels 10, 10 (e.g., rear wheels) through the clutch unit 6 and the transmission unit 8.

Specifically, the rotary driving force (hereinafter merely referred to as driving force) output from the engine 2 is input to the clutch unit 6 through an input shaft 12 and then is split into two within the clutch unit 6. The clutch unit 6 includes two clutches, that is, a first clutch 6a (first clutch) and a second clutch 6b (second clutch). Of two components of the driving force of the engine 2 split within the clutch unit 6, one is transmitted to the input side of the first clutch 6a and the other is transmitted to the input side of the second clutch 6b.

The clutch unit 6, which is illustrated only schematically in FIG. 1, is configured as described below. The first and second clutches 6a and 6b are multiple-plate wet clutches capable of engagement and disengagement in accordance with the pressure of operating oil supplied thereto via hydraulic lines 16a and 16b, respectively, from a hydraulic pump 14 (hydraulic pressure supply unit) which is driven by rotation of the engine 2. Also, the first and second clutches 6a and 6b are arranged coaxially such that the first clutch 6a is located inside while the second clutch 6b is located outside.

The transmission unit 8 includes two transmission mechanisms associated with the first and second clutches 6a and 6b, that is, a first transmission mechanism 8a (G1 in FIG. 1) and a second transmission mechanism 8b (G2 in FIG. 1). The output side of the first clutch 6a is coupled to the input shaft of the first transmission mechanism 8a, and the output side of the second clutch 6b is coupled to the input shaft of the second transmission mechanism 8b.

The first transmission mechanism 8a is provided, as forward gears, with odd-numbered gears, that is, first-, third- and fifth-speed gears. The second transmission mechanism 8b associated with the second clutch 6b is provided as forward gears with even-numbered gears, that is, second-, fourth- and sixth-speed gears. A reverse gear is included in the first transmission mechanism 8a, though not illustrated in FIG. 1.

The driving force output from the first transmission mechanism 8a and that output from the second transmission mechanism 8b are transmitted to a differential gear unit 20 through a common output shaft 18 and then distributed to the right and left driving wheels 10, 10. Thus, the clutch unit 6 and the transmission unit 8 constitute what is called a dual-clutch transmission.

The motor 4 is inserted between the second clutch 6b and the second transmission mechanism 8b. Although not illustrated in detail, the motor 4 is disposed on the outer periphery of the output shaft of the second clutch 6b. More specifically, the rotor of the motor 4 is fixed on the outer periphery of the output shaft of the second clutch 6b, and the stator of the motor 4 is fixed to the casing of the clutch unit 6. That is, the second clutch 6b serves also as the rotary shaft of the motor 4, and as the rotor rotates inside the stator together with the second clutch 6b, driving torque or regenerative torque generated by the magnetic field generated between the rotor and the stator is input to the second transmission mechanism 8b through the second clutch 6b.

The motor 4 is connected via an inverter 24 with a battery 22 mounted on the vehicle 1 and generates driving torque when supplied with electric power from the battery 22. The battery 22 is, for example, a secondary battery such as a lithium-ion secondary battery or nickel-metal-hydride secondary battery. The inverter 24 converts direct-current power stored in the battery 22 to alternating-current power and supplies the converted electric power to the motor 4. On the other hand, during deceleration or the like of the vehicle the motor 4 functions as an electric generator (generator) and is driven regeneratively. Specifically, the motor 4 generates alternating-current power using the driving force transmitted backward from the driving wheels 10, and regenerative torque generated at this time by the motor 4 is applied to the driving wheels 10 as resistance for deceleration. The alternating-current power thus generated is converted to direct-current power by the inverter 24 and then charged in the battery 22, whereby the kinetic energy generated by the rotation of the driving wheels 10 is recovered as electric energy.

In the vehicle 1 configured as described above, when the first and second clutches 6a and 6b are both disengaged, only the rotary shaft of the motor 4 is mechanically connected to the driving wheels 10 through the second transmission mechanism 8b of the transmission unit 8. That is, only the driving torque generated by the motor 4 (hereinafter referred to also as motor torque) is transmitted, as driving torque for the vehicle 1, to the driving wheels 10.

On the other hand, when either of the first and second clutches 6a and 6b is engaged, the engine 2 is mechanically connected to the driving wheels 10 through the transmission mechanism associated with the engaged clutch, out of those of the transmission unit 8. If, at this time, the torque generated by the motor 4 is "0" and the engine 2 alone is operated, the driving torque for the vehicle 1 is equal to the driving torque generated by the engine 2 only (hereinafter referred to also as engine torque). If the motor 4 is also operated with the second clutch 6b engaged, the driving torque for the vehicle 1 is equal to the sum of the driving torque of the motor 4 and that of the engine 2.

In this manner, the vehicle 1 has two power transmission systems, namely, a first power transmission system whereby the power of the engine 2 is transmitted to the driving wheels 10 through the first clutch 6a and the first transmission mechanism 8a, and a second power transmission system whereby the power of the engine 2 and of the motor 4 is transmitted to the driving wheels 10 through the second clutch 6b and the second transmission mechanism 8b.

In order to carry out various control operations such as the adjustment of torque allocation to the engine 2 and the motor 4, the vehicle 1 is equipped with an ECU (Electronic Control Unit) 30 which performs integrated control of the engine 2, the motor 4, the clutch unit 6, the transmission unit 8, the hydraulic pump 14 and the like.

Specifically, the ECU 30 is connected via a CAN (Controller Area Network) with control units (not shown) associated with the engine 2, the motor 4, the clutch unit 6, the transmission unit 8, the hydraulic pump 14 and the like, so as to be able to communicate with the individual control units.

Further, the vehicle 1 is provided with a shift position sensor 32 (gear range detection unit) for detecting a shift position (gear range) currently selected in the transmission unit 8 by the driver's manipulation of the shift lever. The shift position includes a P (park) range selected when the vehicle is parked, an N (neutral) range selected to set the gears of the transmission unit 8 into neutral, a D (drive) range selected when the vehicle is moved forward, and an R (reverse) range selected when the vehicle is moved backward. The ECU 30 is also connected with the shift position sensor 32 via the CAN.

The ECU 30 acquires various information including, in addition to information about the shift position detected by the shift position sensor 32, information about the revolving speed of the engine 2, information about the revolving speed of the motor 4 as well as the motor torque, information about the gear currently selected in the transmission unit 8, information about an SOC (State Of Charge) of the battery 22, and information about the temperature of the operating oil in the hydraulic pump 14.

Also, the ECU 30 monitors the SOC of the battery 22 as well as the operating state of the vehicle 1 and controls the engine 2, the motor 4, the clutch unit 6, the transmission unit 8, the hydraulic pump 14 and the like, in order to achieve operation meeting the driver's demand while optimizing the fuel efficiency and the exhaust emission characteristics.

In this embodiment, when a predetermined automatic engine stop condition is fulfilled, the ECU 30 executes what is called automatic engine stop (idling stop) control, for example, whereby the fuel supply to the engine 2 is stopped. Further, when a predetermined automatic engine start condition is fulfilled after the engine 2 is automatically stopped, the ECU 30 executes what is called automatic engine restart (auto start) control whereby the engine 2 is automatically restarted by cranking the engine 2 with the use of a starter or the like, not shown, and resuming the fuel supply. In this manner, the ECU 30 performs what is called automatic engine stop-and-restart (idling stop-auto start) control.

Fulfillment of the predetermined automatic engine stop condition requires, for example, that the vehicle running speed is substantially "0", that the brake pedal is depressed, and that the accelerator pedal is released.

On the other hand, fulfillment of the predetermined automatic engine restart condition requires, for example, that the above automatic engine stop condition is not fulfilled, that is, the brake pedal is released or the accelerator pedal is depressed.

Also, in this embodiment, the ECU 30 selects respective gears of the first and second transmission mechanisms 8a and 8b in accordance with the operating state of the vehicle 1, and controls the hydraulic pump 14 so that one of the first and second clutches 6a and 6b associated with the transmission mechanism that is used for traveling may be engaged while the other clutch may be disengaged. The ECU 30 then executes what is called pre-charge control (preliminary pressure application control) whereby the clutch to be engaged is charged with the operating oil in advance so as to be ready for engagement (preliminary pressure application control unit).

However, when the vehicle 1 is to be started by using the motor 4 only from a standstill with a predetermined condition for using the motor 4 fulfilled and also if the engine 2 has been started in response to the driver's key "ON" operation or by the aforementioned engine restart control or if the shift position has been switched from the N range to the D range, the ECU 30 delays the timing for executing the pre-charge control (preliminary pressure application delay control).

In the following, the pre-charge control executed by the ECU 30 at the start of the vehicle will be explained in detail.

Figure 2:
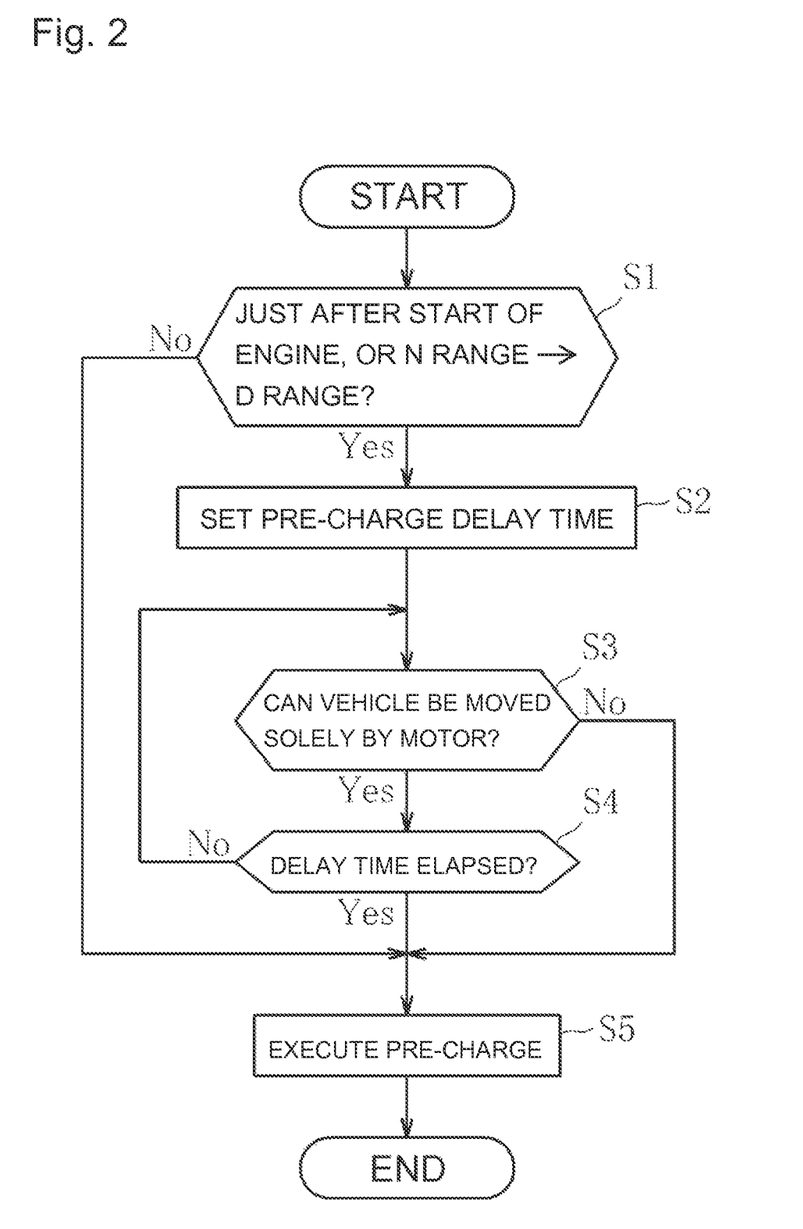
FIG. 2 is a flowchart illustrating a pre-charge control routine executed at the start of the hybrid electric vehicle by an ECU of the control device according to the embodiment of the present invention.
Figure 3:
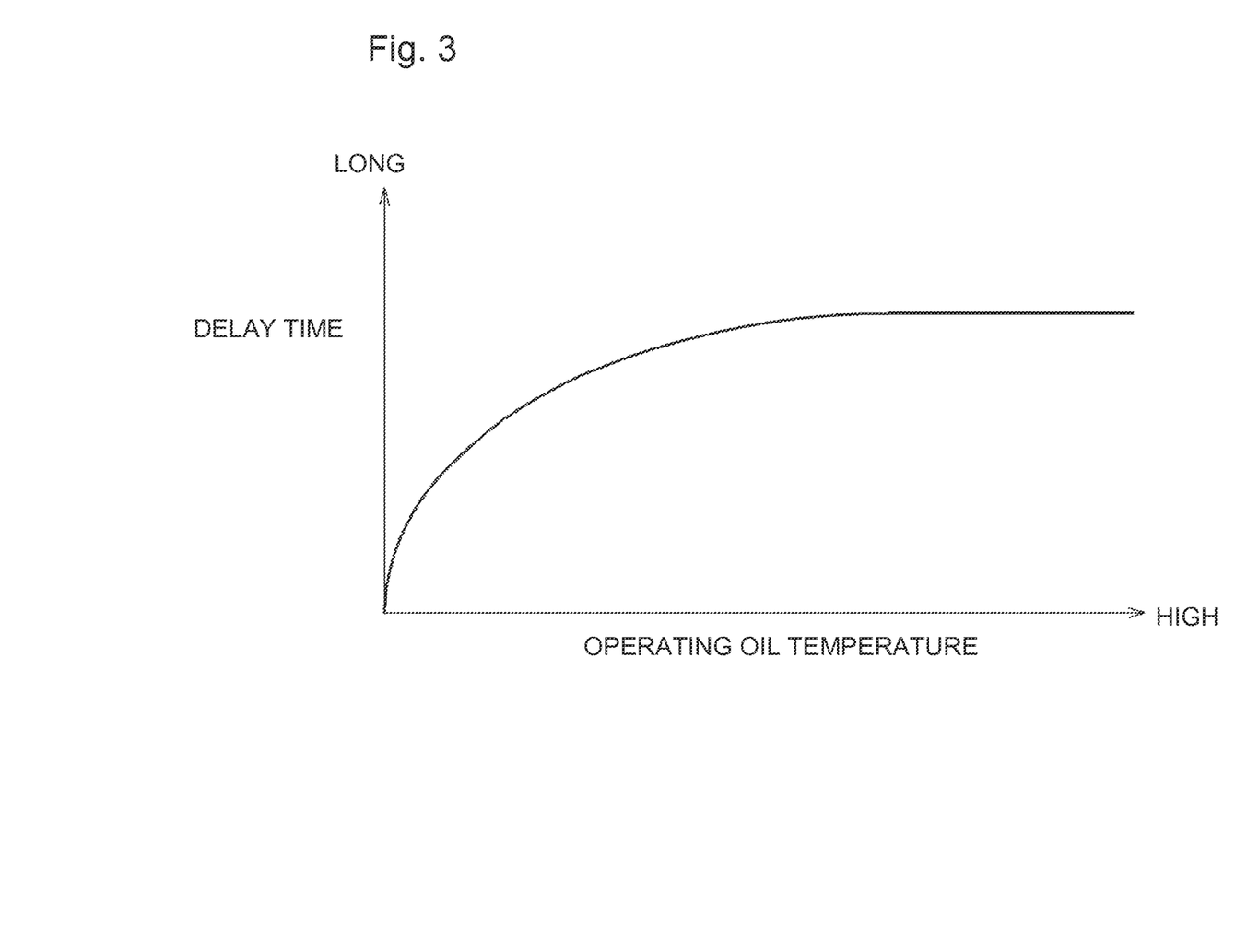
FIG. 3 illustrates a map used for setting a pre-charge delay time.

FIG. 2 is a flowchart illustrating a pre-charge control routine executed in this embodiment by the ECU 30 at the start of the vehicle, and FIG. 3 illustrates a map used for setting a pre-charge delay time. The pre-charge control will be explained below with reference to the flowchart of FIG. 2 and, when necessary, to FIG. 3. This control is initiated (started) by the ECU 30 when the vehicle 1 is to be started by the motor 4 alone.

First, in Step S1 of FIG. 2, the ECU 30 determines whether or not the vehicle 1 is in either one of a state where the engine 2 has just been started because of fulfillment of the automatic engine restart condition or in response to the "ON" operation of the key performed by the driver while the engine 2 is stopped, and a state where a changeover from the N range to the D range has been detected on the basis of the information from the shift position sensor 32. That is, in Step S1, it is determined whether the first and second clutches 6a and 6b are running short of the operating oil or not because, if the engine 2 was stopped or the N range was selected immediately before the vehicle is started by the motor 4, the operating oil runs short due to interruption of the supply of the operating oil to the first and second clutches 6a and 6b from the hydraulic pump 14. If the result of the determination is affirmative (Yes), that is, if the first and second clutches 6a and 6b are running short of the operating oil, the routine proceeds to Step S2.

In Step S2, the ECU 30 sets a pre-charge delay time on the basis of the map shown in FIG. 3.

As illustrated in FIG. 3, the map is set such that the delay time becomes longer with increase in the temperature of the operating oil in the hydraulic pump 14 up to a fixed temperature, and that the delay time is set to a fixed time at and above the fixed temperature. After the delay time is set in accordance with the map, the ECU 30 proceeds to Step S3.

In Step S3, the ECU 30 determines whether or not the vehicle can be moved by means of the motor 4 only. Specifically, the ECU 30 judges that the vehicle cannot be moved solely by the motor 4 in situations where, for example, the motor 4 is in a failure state because of deficiency of the SOC of the battery 22 or failure of the motor 4, where the accelerator pedal is depressed greatly to demand such sudden acceleration that the motor torque alone is unable to meet the demanded torque, and where the vehicle cannot be moved forward by the creeping with the use of the motor torque only when the vehicle is started, for example, on an uphill road. If the result of the determination is affirmative (Yes) and thus the vehicle is not in any of the above situations, that is, if the motor 4 is normal and the demanded torque can be met solely by the motor torque, the routine proceeds to Step S4.

In Step S4, the ECU 30 determines whether or not the pre-charge delay time set in Step S2 has elapsed from the start of the engine 2 or from the changeover of the shift position from the N range to the D range. If the delay time has not elapsed yet and thus the result of the determination is negative (No), the routine returns to Step S3. On the other hand, if the delay time has elapsed and thus the result of the determination becomes affirmative (Yes), the routine proceeds to Step S5.

In Step S5, the ECU 30 executes pre-charge by starting the supply of the operating oil from the hydraulic pump 14 to the first and second clutches 6a and 6b. After the clutches 6a and 6b are charged with the operating oil, the routine ends.

If the result of the determination in Step S3 becomes negative (No) before the delay time elapses, that is, if it is judged that the vehicle cannot be moved solely by the motor 4, Step S5 is executed immediately to execute the pre-charge. This makes it possible to generate the engine torque earlier, though some vibration may occur, and also prevents the start of the vehicle from being delayed.

Further, if it is judged in Step S1 that the vehicle is neither in a state where the engine has just been started nor in a state where the shift position has been changed from the N range to the D range, that is, if the result of the determination in this step is negative (No), Step S5 is executed to carry out the pre-charge immediately. That is, in cases where the engine 2 has been operating or the vehicle has been stopped with the shift position kept at the D range when the vehicle is to be started by the motor, for example, the first and second clutches 6a and 6b are already charged with the operating oil, and therefore, the pre-charge is executed ordinarily without delay.

As stated above, if the engine has just been started or the shift position has been changed from the N range to the D range when the vehicle 1 is to be started solely by the motor 4, the pre-charge is not immediately executed but is executed after a lapse of the predetermined delay time. Consequently, the pre-charge is performed after the rotation of the motor 4 becomes stable, and even if the clutches 6a and 6b temporarily come into a power transmission state due to the pre-charge, vibration attributable to the interference with the rotation of the engine 2 does not occur.

It is therefore possible to suppress vibration caused by the pre-charge at the start of the hybrid electric vehicle equipped with a dual-clutch transmission, and thus to alleviate the driver's discomfort.

Especially, in this embodiment, the ECU 30 sets the delay time for delaying the pre-charge, in accordance with the temperature of the operating oil, as shown in FIG. 3. The vibration caused when the vehicle is started solely by the motor 4 is thought to occur depending on the temperature of the operating oil. Thus, by setting the delay time for delaying the pre-charge in accordance with the temperature of the operating oil, it is possible to appropriately suppress such vibration.

Also, in the embodiment, if the engine has just been started, the ECU 30 delays executing the pre-charge, and since delay of the pre-charge is effected so as to work with the automatic engine stop-and-restart control whereby the engine 2 is frequently stopped and restarted, it is possible to satisfactorily reduce the driver's discomfort. Further, also when the shift position is changed from the N range to the D range, the pre-charge is delayed. Thus, even in the case where the clutches 6a and 6b are running short of the operating oil because of escape of the operating oil during the selection of the N range, the vibration caused by the pre-charge at the start of the vehicle can be suppressed.

While the control device for a hybrid electric vehicle according to the embodiment of the present invention has been described above, it is to be noted that the present invention is not limited to the foregoing embodiment.

For example, the predetermined automatic engine stop condition and the predetermined automatic engine start condition to be employed in the embodiment are not limited to the aforementioned conditions, and other suitable conditions may be used instead.

Also, in the foregoing embodiment, the pre-charge delay time is set on the basis of the map of FIG. 3 such that the higher the temperature of the operating oil, the longer the delay time becomes. The delay time may be set as a function of some other parameter than the operating oil temperature.

For example, where the vehicle is to be started by the motor immediately after the engine is started by the automatic restart control or in response to the "ON" operation of the key, the delay time may be set taking account of a stop time over which the engine has been stopped, such that the delay time increases with the stop time. The longer the stop time over which the engine is stopped, the more operating oil escapes from the clutches, and therefore, by setting the delay time for delaying the preliminary pressure application control in accordance with the engine stop time, it is possible to appropriately suppress the vibration.

Further, in the above embodiment, the ECU 30 executes the pre-charge delay control if the shift position has been changed from the N range to the D range. The point is that the pre-charge delay control is executed if the shift position has been changed from the N range to a range for moving the vehicle 1, and therefore, the pre-charge delay control may be executed also if the shift position has been changed from the N range to the R range, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS LIST

1 vehicle
2 engine
4 motor (electric motor)
6 clutch unit
6a first clutch (first clutch)
6b second clutch (second clutch)
8 transmission unit (transmission)
8a first transmission mechanism
8b second transmission mechanism
14 hydraulic pump (hydraulic pressure supply unit)
30 ECU (preliminary pressure application control unit, preliminary pressure application delay control unit, automatic engine stop-and-restart control unit)
32 shift position sensor (gear range detection unit)

The invention claimed is:

1. A control device for a hybrid electric vehicle having an engine and an electric motor both as a drive source for traveling, a transmission having a first transmission mechanism and a second transmission mechanism, a first power transmission system configured to transmit power of the engine to driving wheels through the first transmission mechanism, a second power transmission system configured to transmit the power of the engine and of the electric motor to the driving wheels through the second transmission mechanism, a first clutch associated with the first power transmission system and arranged between the engine and the transmission, and a second clutch associated with the second power transmission system and arranged between the engine and the electric motor, the control device comprising:
   a hydraulic pressure supply unit configured to supply operating oil to the first and second clutches such that hydraulic pressure of the operating oil is applied to the first and second clutches;
   a preliminary pressure application control unit configured to execute preliminary pressure application control such that the first and second clutches are charged in advance with the operating oil by the hydraulic pressure supply unit before the first and second clutches are engaged; and
   a preliminary pressure application delay control unit configured to delay timing for starting the preliminary pressure application control by the preliminary pressure application control unit, by a predetermined delay time when the vehicle is to be started solely by the electric motor.

2. The control device of claim 1, wherein the preliminary pressure application delay control unit sets the delay time in accordance with temperature of the operating oil supplied by the hydraulic pressure supply unit.

3. The control device of claim 1, wherein
   the hydraulic pressure supply unit is driven by rotation of the engine, and
   when the vehicle is to be started solely by the electric motor after the engine in a stopped state is started, the preliminary pressure application delay control unit sets the delay time in accordance with a time over which the engine has been stopped.

4. The control device of claim 1, further comprising:
   an automatic engine stop-and-restart control unit configured to stop fuel supply to the engine when a predetermined automatic engine stop condition is fulfilled, and to restart the engine when a predetermined automatic engine start condition is fulfilled,
   wherein the preliminary pressure application delay control unit delays timing for starting the preliminary pressure application control by the preliminary pressure application control unit, by a predetermined delay time when the vehicle is to be started solely by the electric motor after the engine is restarted by the automatic engine stop-and-restart control unit.

5. The control device of claim 1, further comprising:
   a gear range detection unit configured to detect a gear range selected in the transmission,
   wherein the preliminary pressure application delay control unit delays timing for starting the preliminary pressure application control by the preliminary pressure application control unit, by a predetermined delay time when the vehicle is to be started solely by the electric motor after a changeover from a neutral range to a range for traveling is detected by the gear range detection unit.

6. A hybrid electric vehicle, comprising:
   an engine and an electric motor both as a drive source for traveling;
   a transmission having a first transmission mechanism and a second transmission mechanism;
   a first power transmission system configured to transmit power of the engine to driving wheels through the first transmission mechanism;
   a second power transmission system configured to transmit the power of the engine and of the electric motor to the driving wheels through the second transmission mechanism;
   a first clutch associated with the first power transmission system and arranged between the engine and the transmission;
   a second clutch associated with the second power transmission system and arranged between the engine and the electric motor; and
   a control device comprising
      a hydraulic pressure supply unit configured to supply operating oil to the first and second clutches such that hydraulic pressure of the operating oil is applied to the first and second clutches;
      a preliminary pressure application control unit configured to execute preliminary pressure application control such that the first and second clutches are charged in advance with the operating oil by the hydraulic pressure supply unit before the first and second clutches are engaged; and a preliminary pressure application delay control unit configured to delay timing for starting the preliminary pressure application control by the preliminary pressure application control unit, by a predetermined delay time when the vehicle is to be started solely by the electric motor.

7. The hybrid electric vehicle of claim 6, wherein the preliminary pressure application delay control unit sets the delay time in accordance with temperature of the operating oil supplied by the hydraulic pressure supply unit.

8. The hybrid electric vehicle of claim 6, wherein
the hydraulic pressure supply unit is driven by rotation of the engine, and
when the vehicle is to be started solely by the electric motor after the engine in a stopped state is started, the preliminary pressure application delay control unit sets the delay time in accordance with a time over which the engine has been stopped.

9. The hybrid electric vehicle of claim 6, further comprising:
an automatic engine stop-and-restart control unit configured to stop fuel supply to the engine when a predetermined automatic engine stop condition is fulfilled, and to restart the engine when a predetermined automatic engine start condition is fulfilled,
wherein the preliminary pressure application delay control unit delays timing for starting the preliminary pressure application control by the preliminary pressure application control unit, by a predetermined delay time when the vehicle is to be started solely by the electric motor after the engine is restarted by the automatic engine stop-and-restart control unit.

10. The hybrid electric vehicle of claim 6, further comprising:
a gear range detection unit configured to detect a gear range selected in the transmission,
wherein the preliminary pressure application delay control unit delays timing for starting the preliminary pressure application control by the preliminary pressure application control unit, by a predetermined delay time when the vehicle is to be started solely by the electric motor after a changeover from a neutral range to a range for traveling is detected by the gear range detection unit.

11. A method for operating a control device for a hybrid electric vehicle having an engine and an electric motor both as a drive source for traveling, a transmission having a first transmission mechanism and a second transmission mechanism, a first power transmission system configured to transmit power of the engine to driving wheels through the first transmission mechanism, a second power transmission system configured to transmit the power of the engine and of the electric motor to the driving wheels through the second transmission mechanism, a first clutch associated with the first power transmission system and arranged between the engine and the transmission, and a second clutch associated with the second power transmission system and arranged between the engine and the electric motor, the method comprising:
supplying, by a hydraulic pressure supply unit, operating oil to the first and second clutches such that hydraulic pressure of the operating oil is applied to the first and second clutches;
executing, by a preliminary pressure application control unit, preliminary pressure application control such that the first and second clutches are charged in advance with the operating oil by the hydraulic pressure supply unit before the first and second clutches are engaged; and
delaying, by a preliminary pressure application delay control unit, timing for starting the preliminary pressure application control by the preliminary pressure application control unit, by a predetermined delay time when the vehicle is to be started solely by the electric motor.

12. The method of claim 11, wherein the preliminary pressure application delay control unit sets the delay time in accordance with temperature of the operating oil supplied by the hydraulic pressure supply unit.

13. The method of claim 11, wherein
the hydraulic pressure supply unit is driven by rotation of the engine, and
when the vehicle is to be started solely by the electric motor after the engine in a stopped state is started, the preliminary pressure application delay control unit sets the delay time in accordance with a time over which the engine has been stopped.

14. The method of claim 11, wherein
the control device includes an automatic engine stop-and-restart control unit configured to stop fuel supply to the engine when a predetermined automatic engine stop condition is fulfilled, and to restart the engine when a predetermined automatic engine start condition is fulfilled, and
the preliminary pressure application delay control unit delays timing for starting the preliminary pressure application control by the preliminary pressure application control unit, by a predetermined delay time when the vehicle is to be started solely by the electric motor after the engine is restarted by the automatic engine stop-and-restart control unit.

15. The method of claim 11, further comprising:
detecting, by a gear range detection unit, a gear range selected in the transmission,
wherein the preliminary pressure application delay control unit delays timing for starting the preliminary pressure application control by the preliminary pressure application control unit, by a predetermined delay time when the vehicle is to be started solely by the electric motor after a changeover from a neutral range to a range for traveling is detected by the gear range detection unit.

* * * * *